(No Model.) 4 Sheets—Sheet 1.

W. F. BROWN.
ELECTRIC MOTOR OR GENERATOR.

No. 455,726. Patented July 7, 1891.

Witnesses.
C. G. Hawley.
L. S. Weinzierl

Inventor.
Walter F. Brown.
By Paul Merwin Attys.

(No Model.)  4 Sheets—Sheet 3.
W. F. BROWN.
ELECTRIC MOTOR OR GENERATOR.

No. 455,726.  Patented July 7, 1891.

Witnesses.  
O. G. Hawley.  
L. S. Heinzerl.

Inventor.  
Walter F. Brown.  
By Paul O'Menin Attys.

(No Model.) 4 Sheets—Sheet 4.
W. F. BROWN.
ELECTRIC MOTOR OR GENERATOR.
No. 455,726. Patented July 7, 1891.
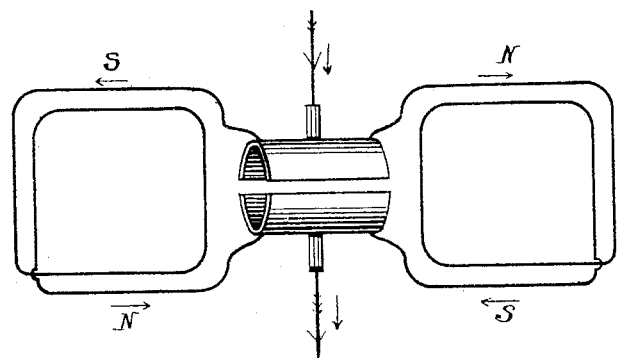
Fig. 7.
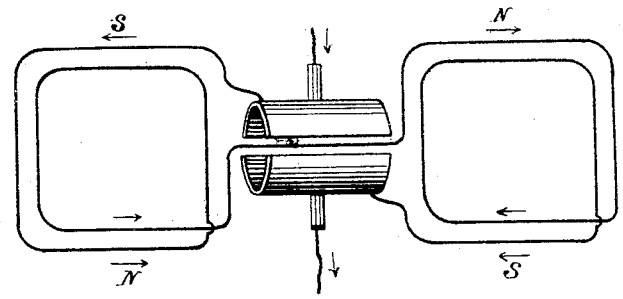
Fig. 8.
Fig. 9.
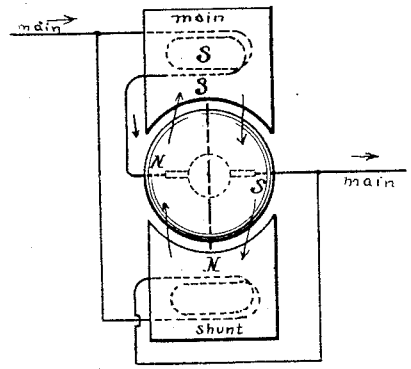
Fig. 10.
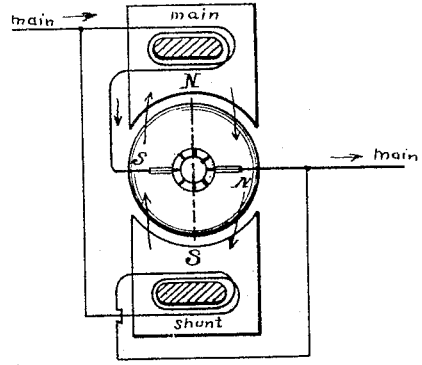
Witnesses.
O. G. Hawley
A. Mac Welch
Inventor.
Walter F. Brown.
By Paul Mumm Attys.

UNITED STATES PATENT OFFICE.

WALTER F. BROWN, OF ST. PAUL, MINNESOTA, ASSIGNOR OF TWO-THIRDS TO WILLIAM F. BAILEY, GEORGE N. BAILEY, AND CHARLES N. NITTERAUER, ALL OF SAME PLACE.

ELECTRIC MOTOR OR GENERATOR.

SPECIFICATION forming part of Letters Patent No. 455,726, dated July 7, 1891.

Application filed August 21, 1890. Serial No. 362,568. (No model.)

*To all whom it may concern:*

Be it known that I, WALTER F. BROWN, of St. Paul, Ramsey county, Minnesota, have invented certain Improvements in Electric Motors or Generators, of which the following is a specification.

My invention relates to electric motors and generators belonging to that class which are practically self-regulating, readily adjusting themselves to the varying conditions of the load, and also to that type in which the two armatures are arranged upon the same shaft in connection with the field-magnets.

The object of my invention is to provide an electric machine of economical construction, superior efficiency, and adapted to be rotated in either direction.

My invention consists in the combination, in an electric motor or generator energized by a continuous electric current, of two similar armatures connected to a common commutator arranged between them and mounted upon a common shaft. Pole-pieces are arranged beneath both of said armatures and connected together by a core or bridge of the same material lying between the inner ends thereof and formed integral therewith. Two similar pole-pieces are supported above the armatures and correspond in form and construction with the lower pole-pieces, and are provided with a similar connecting-core. Series and shunt windings are arranged upon the upper and lower cores, respectively, and connected to the brushes and the mains of the working-circuit.

My invention further consists in an improved form of brush-holder, by means of which the brushes may be brought into proper contact with the commutator in whichever direction it is rotated.

My invention also consists in the construction and combination hereinafter described, and particularly pointed out in the claims.

Figure 1:
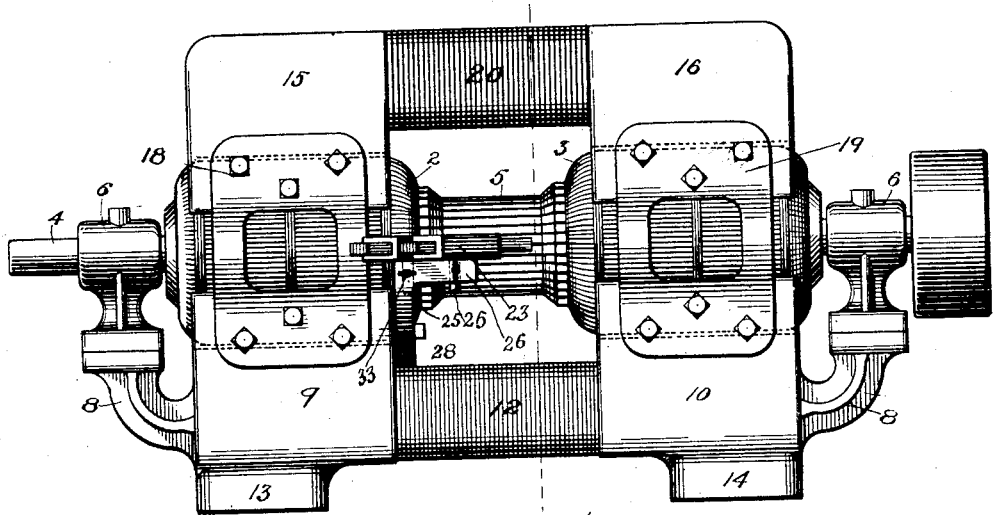
Figure 2:
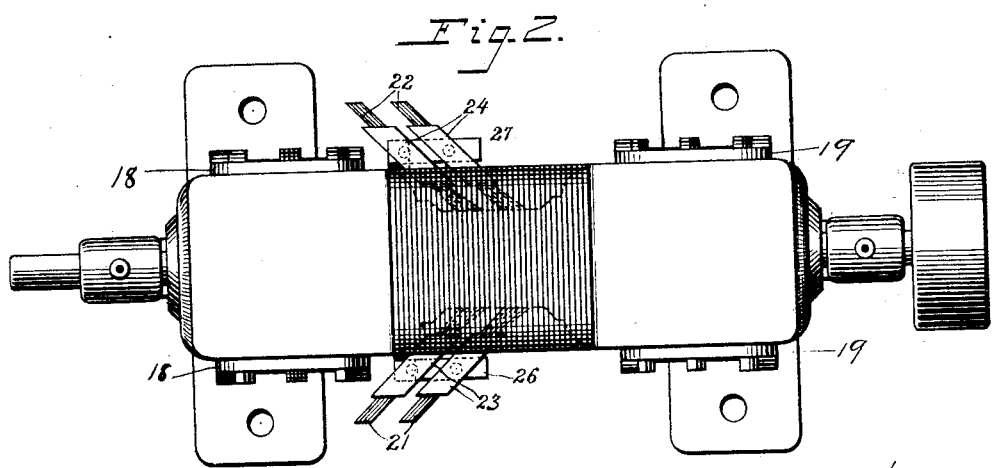
Figure 3:
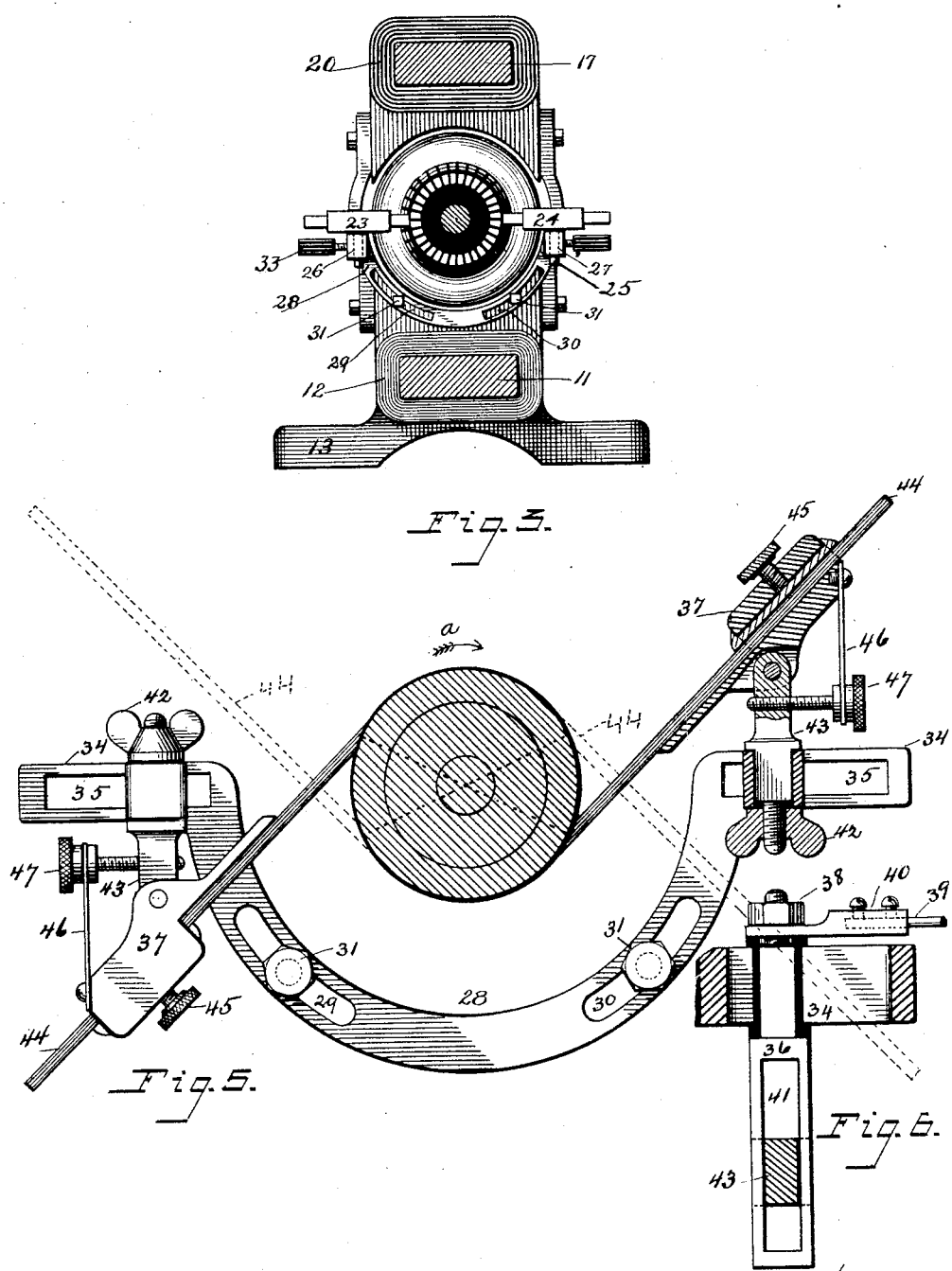
Figure 4:
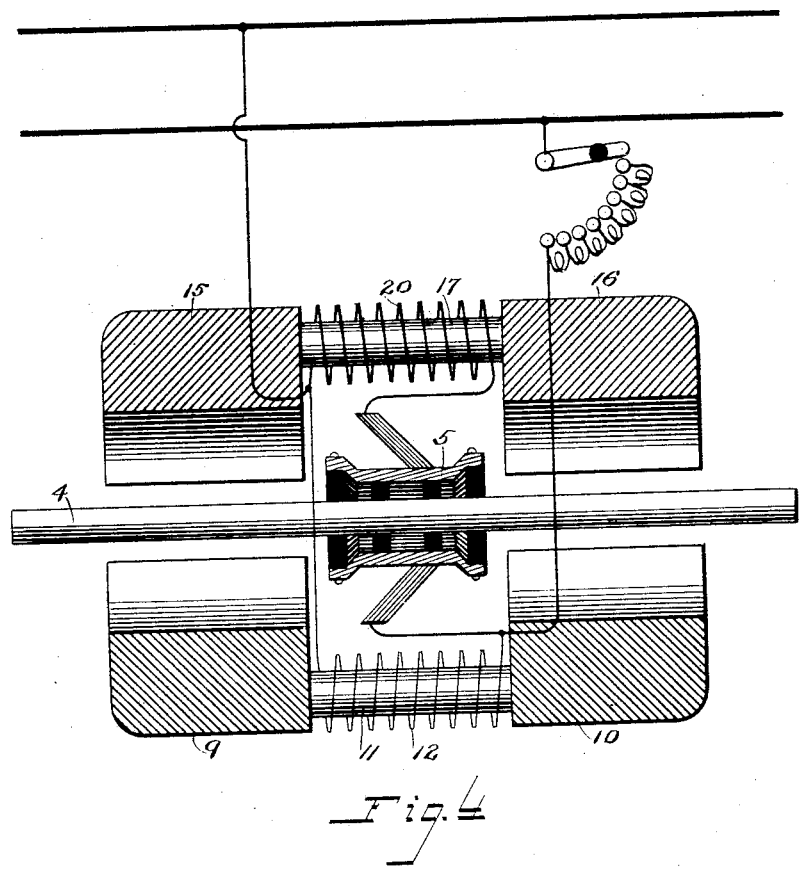

In the accompanying drawings, forming part of this specification, Figure 1 is a side elevation of an electric motor or generator embodying my invention. Fig. 2 is a plan view thereof. Fig. 3 is a transverse sectional elevation of the same, taken upon line $x\ x$ of Fig. 1. Fig. 4 is a diagrammatic view of the windings and circuits of my machine, also showing the construction of my special commutator. Figs. 5 and 6 show a modified construction of brush-holder. Fig. 7 is a diagrammatic plan view showing multiple-arc windings; Fig. 8, a similar view showing series winding; and Figs. 9 and 10 are respectively an end elevation and vertical cross-section through the commutator, showing the polarities of the various parts of the machine.

As shown in the drawings, the armatures 2 and 3 are mounted upon a common shaft 4, their windings being connected to the opposite ends of the commutator-segments. The armatures are wound preferably in multiple arc, as shown in Fig. 7, only one winding on each armature and two commutator-segments being shown. It will thus be seen that the portions of the two armatures lying in the same plane and upon the same side of the shaft are of opposite polarities. The armatures may be either of the Gramme or drum type, having the common commutator 5 arranged between them upon the shaft 4, and are insulated from the shaft and from each other, except by the connection through the segments of the commutator. The shaft 4 is supported by and adapted to rotate in bearings 6 6, which are in turn supported upon arms 8 8, preferably made of non-magnetic material and secured to the opposite ends of the lower field-magnet, which field-magnet is made up of the pole-pieces 9 and 10, connected together by the core 11, upon which the shunt-winding 12 is arranged, as shown. The feet 13 and 14, also made of non-magnetic material to prevent the scattering of the lines of force, are formed upon or attached to the bottom of the pole-pieces 9 and 10, respectively, by means of which the machine may be secured firmly upon its support or carriage. The upper pole-pieces 15 and 16, connected by core 17, are arranged above the armatures and there secured by the perforated straps 18 and 19, of non-magnetic material, bolted to the upper and lower pieces 15 and 9 and 16 and 10, respectively, as shown.

The series winding 20 of the field-magnets is coiled upon the upper core 17 and is relied upon for the automatic regulation of the machine. It is obvious that the series and shunt windings might be divided and a portion of each wound upon either of the field-magnet cores, the same automatic regulation being attained in both cases. The armatures may also be wound in series, as shown in Fig. 8, and the same results be attained therefrom as when wound in multiple arc. In Figs. 7 and 8 the arrows indicate the flow of current, and the polarities of the different parts of the machine are evidently the same in one case as the other. The brushes 21 and 22 may be made of thin plates of copper, or of wire, or sticks of carbon. These brushes are arranged to bear on the sides of the commutator in a plane at right angles with a plane passed through the centers of the pole-pieces and the armature-shaft, the armature-windings lying in the same plane as their respective commutator-segments. The relative positions of these parts appear most clearly in Figs. 7 to 10, the brushes, as shown in Fig. 4, being twisted or distorted out of their true position in order to show the connections. A neutral plane is thus established in approximately a vertical position, passing through the center of the commutator, as indicated by the dotted lines in Figs. 9 and 10. As shown in Figs. 1, 2, and 3, these brushes lie in the same plane with the axis of the shaft 4, and consequently bear against the commutator in such manner that the commutator may be revolved in either direction and with slight resistance from the brushes. The brush-holders 23 and 24, of the form shown in Figs. 1, 2, and 3, are provided with the studs 25, adapted to be inserted in openings in the arms 26 and 27, and are secured therein by suitable thumb-screws 33. The arms 26 and 27 form the upper and projecting ends of the semicircular carrier or yoke 28, secured upon the inner end of the pole-piece 9. This yoke is provided with the slots 29 and 30, through which the locking-bolts 31 are adapted to be inserted into the end of the pole-piece. Upon loosening these bolts the carrier 28, with the brushes, may be moved around in either direction, so as to correct any tendency toward sparking at the brushes.

In some cases I prefer to use a modified form of brush-holder, as shown in detail in Figs. 5 and 6, in which the yoke 28 is provided with the diametrically-opposite radial arms or supports 34, having a common axis passing through the center of the shaft 4. These arms or supports are provided with longitudinal slots 35, in which are secured at right angles therewith the connecting-arms 36 of the brush-holders 37. The arms 36 are insulated from the supports 34 and adjustably secured in the slots by means of nuts 38. The line-wire 39 is preferably secured to the clip or washer 40, held in electrical contact with the arm by means of the nut. The arm 36 is thus adjustably secured at any point lengthwise of the support 34, and is also provided with a longitudinal slot 41, in which is similarly adjustably secured, by means of the set-screw 42, the standard 43, to which is pivoted the brush-holder 37. The brush 44 is secured in the holder 37 in the ordinary manner by means of the set-screw 45, and thus arranged to bear upon the commutator in the ordinary manner, the opposite brushes bearing upon the commutator at points exactly opposite each other. The pressure upon the commutator is adjusted by means of a flat spring 46, secured at one end to the brush-holder and engaged at the other end by the adjusting-screw 47, which is threaded into the standard 43. It will thus be seen that the position of the brush-holder may be adjusted with reference to the commutator, both laterally and longitudinally, by moving the arm 36 and standard 43 along their slots 35 and 41, respectively, so as to accurately adjust the position of the brush and equalize the wear of the commutator.

The full lines in Fig. 5 show the position of the brushes as adjusted to the commutator when rotating in the direction indicated by the arrow $a$. When it is desired to rotate the armature oppositely, the brushes can be reversed in their position by simply detaching the standards 43 from the arms 36, removing them and inserting them on the opposite side and there securing them, when the brushes will stand in the positions indicated by the dotted lines.

It is obvious that by altering the dimensions of the machine slightly and changing the position of the brushes the machine can be turned upon its side; but I prefer to construct it in an upright position, as shown. One advantage of my machine is that the armature is easily accessible by simply lifting off the upper field-magnet, when any ordinary repairs may be made upon it as it is turned in its bearings, thereby doing away with the necessity, inconvenience, and loss of time of entirely removing the armature from between the field-magnets. In the construction of my machine I proceed upon the well-known principle that when a bar or horseshoe magnet, either permanently or temporarily magnetized, is cut in two at its neutral point two additional poles are created, both of which will be of substantially the same strength as the original poles, while the original poles will lose little, if any, strength.

In my machine, instead of utilizing merely the inductive strength of the two original poles of the horseshoe-magnet, I practically cut the magnet in two at its neutral point and introduce between the new poles a second armature, preferably connected with the first through the commutator and upon the same shaft, and in this way am enabled with practically the same weight of material used in a machine of the ordinary class to produce nearly, if not quite, double the power generated by the ordinary machine, with a saving of current which would be sufficient to energize the field-magnets of a second machine. It is obvious, further, that my machine may be adapted for use either with arc or incandescent electric circuits; also, that both of the field-magnets may be wound entirely in series, in which case regulation by the adjustment of the commutator-brushes or other means would be required, or that the armatures may be wound in series (see Fig. 8) instead of in multiple, as described. (See Fig. 7.) I however prefer the latter mode of connecting the armatures, as with that arrangement the machine cannot be entirely disabled by short circuits occurring in one or the other of the armatures, but will continue to operate with an output of about half the power of the machine, which could not be the case if the armature were wound in series.

When the machine is made to lie on its side, as would be preferable when used as a street-car motor, the upper sides of the four pole-pieces could be made detachable, so as to facilitate the removal of the armature when repairs are necessary.

I claim—

1. The combination, in an electric motor or generator, of two armatures upon a common shaft, an intermediate commutator upon said shaft, the several windings of the two armatures being connected, respectively, to the opposite ends of the commutator-segments, so that the portions of the two armatures in the same plane and upon the same side of the shaft have opposite polarities, pole-pieces arranged on opposite sides of said armatures, cores connecting the adjacent pole-pieces, field-magnet coils upon said cores, and brushes bearing upon said commutator, substantially as described.

2. In an electric motor or generator, the combination of two pairs of pole-pieces arranged in the same plane, cores connecting the adjacent pole-pieces, field-magnet coils upon said cores, two armatures arranged upon a common shaft, one between each pair of pole-pieces, a common commutator arranged between said armatures upon said shaft, the segments of the commutator being connected to the windings of said armature lying in the same plane, but of opposite polarities, and brushes bearing upon said commutator in a plane at right angles to the plane passing through the centers of the pole-pieces, substantially as and for the purposes set forth.

3. The combination, in an electric motor or generator having an armature adapted to be rotated in either direction, of radial supports on opposite sides of the commutator, brush-holder arms adjustable along said supports, brush-holders adjustable along said arms toward and from said supports, and brushes in said holders bearing upon said commutator, substantially as described.

4. In a dynamo, the combination, with its commutator, of supports extending at right angles to the armature-shaft on opposite sides thereof, with their common axis passing through the center of the shaft, longitudinal slots in said supports, longitudinally-slotted arms adjustably secured in said slots and at right angles therewith, brush-holders adjustably secured to said arms on either side thereof, and brushes in said holders bearing upon said commutator, substantially as and for the purposes set forth.

5. The combination, with the commutator of a reversible dynamo or motor, of fixed radial supports on opposite sides thereof, arms secured at right angles with and adjustable along said supports, standards adapted to be secured upon either side of said arms and adjustable along the same, and brush-holders and brushes carried by said standards, substantially as and for the purposes set forth.

In testimony whereof I have hereunto set my hand this 7th day of August, 1890.

WALTER F. BROWN.

In presence of—
T. D. MERWIN,
LYDIA S. WEINZIERL.